Patented June 7, 1932

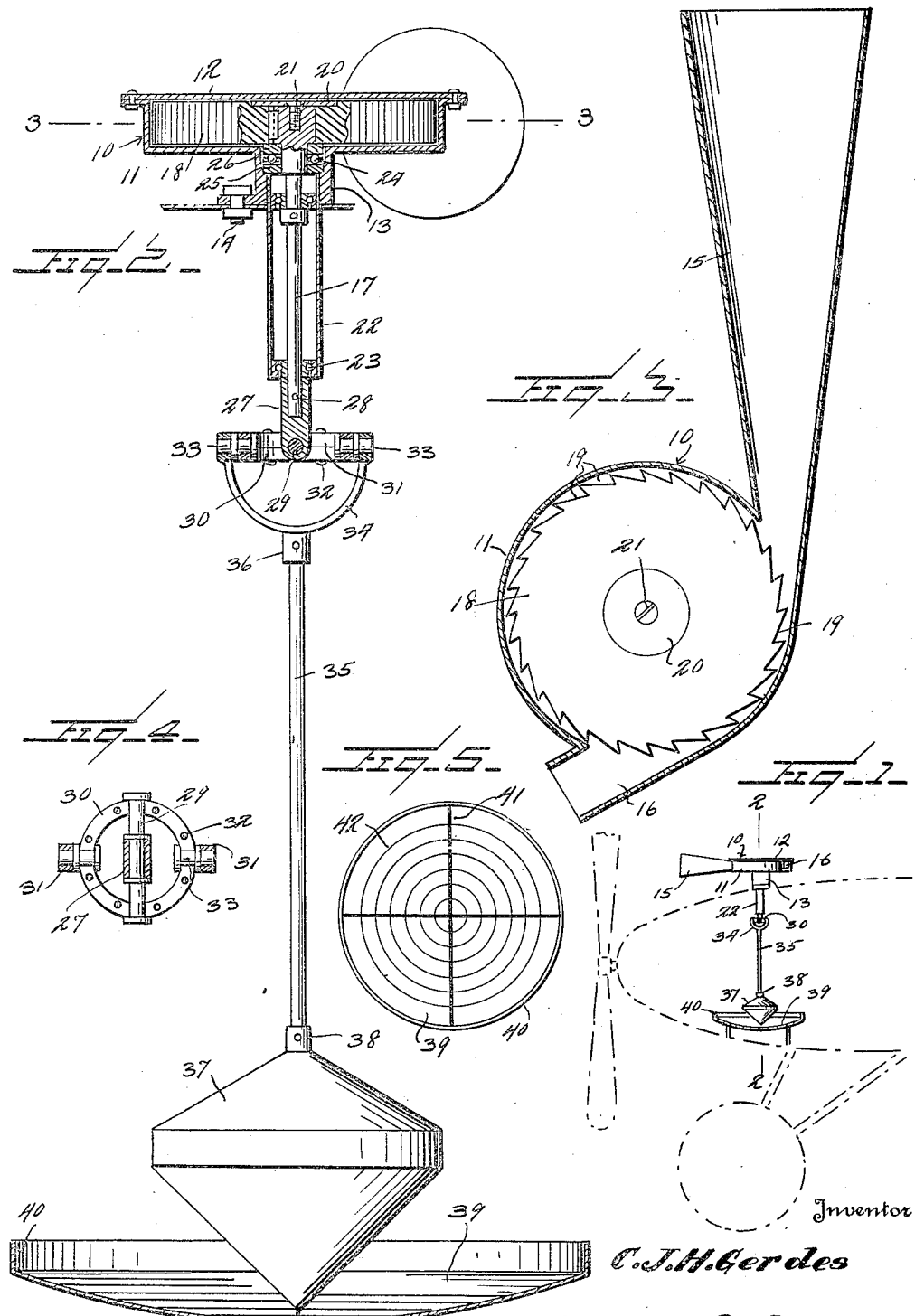

1,861,692

UNITED STATES PATENT OFFICE

CARL JOHN HENRY GERDES, OF HASBROUCK HEIGHTS, NEW JERSEY

BALANCE INDICATOR FOR AIRPLANES

Application filed February 14, 1928. Serial No. 254,279.

This invention relates to devices for indicating whether an airplane is on an even keel or whether it is downwardly inclined or laterally inclined, and the object of the invention is to obviate the danger to a pilot when flying through fog and clouds where it is impossible, because of the fact that the pilot cannot see the horizon, for him to note whether the airplane is on an even keel and is, therefore, unable to correct the direction of movement of the plane until too late.

A further object is to provide a device of this character which includes a pendulum supported in front of the pilot, the inclination of the pendulum to right or left or forward or rearward of an indicating line showing the direction of inclination of the airplane and the degree of this inclination, and also indicating whether or not the pilot has brought the ship back to a proper flying position or the position desired by him.

A still further object is to provide means for rotating the pendulum at a relatively high rate of speed in the manner of a gyroscope so that the rotation of the pendulum will tend to resist lateral movement thereof, thus preventing the device from being too sensitive and swinging unduly.

My invention is illustrated in the accompanying drawing, wherein:—

Figure 1 is a diagrammatic view of my device mounted in connection with an airplane, it being understood, of course, that the device itself need not bear the proportions that it does in the illustration;

Figure 2 is an elevation partly in section of my indicator;

Figure 3 is a section on the line 3—3 of Fig. 2;

Figure 4 is a section through the gimbal joint which supports the pendulum;

Figure 5 is a top plan view of the bowl within which the pendulum swings.

Referring to this drawing, it will be seen that the indicator comprises a horizontally disposed windwheel casing, designated 10. This casing is circular in form and is formed of a lower section 11 and a top 12, the lower section having a downwardly extending hub 13 supported upon the coweling of the fuselage by means of a bolt 14. Extending tangentially from the casing is an outwardly flaring air inlet pipe or receiver 15, and also extending tangentially from the casing 10 is an outlet 16.

Mounted within the casing and rotating with a spindle 17 is a windwheel 18, which may be of any desired form but which is illustrated as being formed on its periphery with the pockets or blades 19. As shown, this windwheel is keyed to the spindle 17 and is held in place by means of the washer 20 and screw 21. Extending downward from the hub 13 is a tubular casing 22 through which the reduced lower portion of the spindle 17 extends. The spindle is supported within the tube 22 by ball bearings or other anti-friction bearings 23 and the windwheel is supported upon ball bearings 24, the balls of these bearings resting upon the lower raceways 25 and bearing against the upper raceway 26 which is carried by the wheel 18. Any other suitable means for supporting the spindle may be used.

The lower end of the spindle 17 carries pinned upon it an enlarged cylindrical member 27 pinned to the spindle at 28 and forming part thereof. The lower end of this member 27 carries the transversely extending shaft 29 which has bearing at its ends in a pair of confronting gimbal rings 30 and 31, these rings being held together by screws 32. Mounted in bearings between these rings 30 and 31 and on an axis at right angles to the axis of the shaft 29 are the gudgeons or short shafts 33, and swingingly engaged with the outer ends of these gudgeons is a yoke 34 which depends therefrom and supports a pendulum comprising the pendulum rod 35, whose upper end is disposed within a socket 36 carried by the yoke 34 and a pendulum bob 37 carried upon the lower end of the pendulum rod. This bob is quite heavy and the lower end of the bob has the form of an inverted cone. The rod 35 may be held in place in the bob by means of a set screw or pin 38.

It will be seen that by this construction the pendulum can vibrate or swing in two planes at right angles to each other or in a plurality of planes radial to the axial center of the shaft 17. The pendulum is in effect connected to the spindle or shaft 17 by a universal joint which permits the easy swinging of the pendulum in any direction but which will at the same time transmit rotatory movement to the pendulum.

Disposed below the pendulum is a relatively shallow bowl-shaped dial 39 having a curvature parallel to the path of movement of the lowest portion of the pendulum in any direction and having an upstanding rim 40 which limits the movement of the pendulum. This dial, as shown in Figure 5, has diametrically extending indicating lines 41 and the interior of the dial also is formed with a plurality of circles 42 concentric, of course, to the center of the dial and intersecting the lines 41. It will be understood that degree marks might be applied in connection with these lines 41 or the circles so as to indicate the degree of inclination of the dial with respect to the vertical pendulum and the direction which said angle of inclination takes. The pendulum and dial will thus indicate the extent to which the airplane is being tilted either in a forward or rear direction or in a lateral direction. Two powers, it will be seen, are working together to resist movement of the pendulum, namely the weight of the pendulum bob 37 and the resistance or inertia due to the high speed of rotation of the pendulum bob 37 which operates in the well known manner to resist movement of the bob from the position it occupies at any one time to the other position. Obviously, the longer the pendulum, the greater the weight of the pendulum bob and the steadier will be the movement of the pendulum.

The rim 42 limits the movement of the pendulum so that the pendulum will not swing out or off of the dial when the aviator is doing stunts or flying upside down or the like. It will be seen that this indicator will indicate to a pilot when flying through the dark or through fog or clouds or in any case where he cannot see the horizon whether he is flying with his machine in proper balance or not. It will indicate any lateral tipping of the machine or any longitudinal tipping of the machine or a compound tilting movement both laterally and longitudinally. By its use the aviator can tell to what degree his ship is tilted or banked in case he wishes to tilt the ship and whether it is nosing down or nosing up and the degree of the angle to the horizontal made by the ship. At the same time, the high rotational speed given to the pendulum bob and rod and the weight of the pendulum bob and rod will tend to resist slight vibrations and oscillations of the pendulum bob which would be confusing.

While I have illustrated a particular form of my invention, I do not wish to be limited thereto as it might be embodied in other forms without departing from the spirit thereof as defined in the appended claims.

I claim:—

1. An inclinometer for use with airplanes comprising a vertically rotatable spindle, a pendulum connected to the lower end of the spindle for rotation therewith around the longitudinal axis of the pendulum but adapted to swing in a plurality of planes radial to the axis of the spindle, the pendulum terminating in a heavy bob, means for rotating the spindle at a high rate of speed and a dial fixed with relation to the pendulum and over which the pendulum freely moves.

2. An inclinometer for use with airplanes comprising a spindle, a pendulum connected to the lower end of the spindle for rotation therewith but adapted to swing in a plurality of planes radial to the axis of the spindle, the pendulum having a heavy bob, a windwheel mounted upon the spindle and having a casing, and means for admitting air to said casing to drive the windwheel at a high rate of speed including an outwardly flaring receiver opening into the casing at a tangent thereto, the casing having an outlet.

3. An inclinometer for airplanes comprising a circular casing having a tangential air funnel opening thereinto and having an air outlet, a spindle extending into the casing and carrying a windwheel formed with peripheral blades against which the wind from said funnel strikes, an anti-friction support for the spindle holding the spindle at right angles to the windwheel, and a pendulum operatively connected to the lower end of the spindle for rotation therewith, said pendulum being adapted to swing in a plurality of planes with relation to the spindle, and a dial over which said pendulum moves.

4. An inclinometer for airplanes comprising a casing having a hub and a tubular extension therefrom, the casing having a funnel-shaped air inlet and having an outlet, a windwheel mounted within the casing and having peripheral blades, a spindle carried by the wheel and extending downward through the hub and tubular extension, anti-friction bearings for said spindle, a pendulum having a bob at its lower end and a gimbal ring at its upper end disposed in a plane at right angles to the pendulum, a member mounted on the lower end of the spindle for rotative movement around an axis at right angles to the longitudinal axis of the spindle, said member carrying a bearing mounted on and extending diametrically across said gimbal rings and disposed in a plane at right angles to the pendulum and at right angles to the first named bearing whereby the pendulum may swing in a plurality of planes radial to the central axis of the spindle.

5. An inclinometer for airplanes including a rotative member, a spindle carried thereby, a pendulum operatively connected to the spindle to rotate therewith but mounted for swinging movement in a plurality of planes radial to the spindle, a bob carried by the lower end of the pendulum, an upwardly dished dial over which the bob moves, the dial having a rim limiting the movement of the bob and preventing the bob from swinging out of the dial, the dial having indicating marks extending diametrically across the dial, and a series of circles concentric to the dial.

6. An inclinometer for airplanes including an oscillatable pendulum, and means for rotating the pendulum at a high speed around the longitudinal axis of the pendulum, said means including an air operated driving element operatively connected to the pendulum to rotate therewith, and means to direct a current of air against said element and a dial over which the lower extremity of the pendulum moves freely in all directions, said dial having graduations showing the extent and direction of movement of the pendulum.

7. An inclinometer for use with airplanes comprising a spindle rotatable around a vertical axis, a pendulum connected to the lower end of the spindle for rotation therewith but adapted to swing in a plurality of planes radial to the axis of the spindle, the pendulum terminating in a heavy bob, a wind wheel mounted upon the spindle for rotation therewith, and having a casing provided with a wind discharge opening, means for receiving air currents directed against the plane when in motion and directing said air currents into said casing to drive the wind wheel at a high rate of speed, and a dial coacting with the pendulum and over which the pendulum freely moves in any direction diametric to the dial.

In testimony whereof I hereunto affix my signature.

CARL JOHN HENRY GERDES.